April 25, 1944.  J. WIEGRATZ  2,347,383
VEGETABLE GRATER
Filed April 5, 1943  2 Sheets-Sheet 1

INVENTOR,
John Wiegratz
BY
Victor J. Evans & Co.
ATTORNEYS

April 25, 1944.                J. WIEGRATZ                2,347,383
                            VEGETABLE GRATER
                         Filed April 5, 1943            2 Sheets-Sheet 2

John Wiegratz,
               INVENTOR.
BY
       Victor J. Evans & Co.
                    ATTORNEYS Patented Apr. 25, 1944

2,347,383

UNITED STATES PATENT OFFICE 2,347,383

VEGETABLE GRATER

John Wiegratz, Kempton, W. Va.

Application April 5, 1943, Serial No. 481,896

3 Claims. (Cl. 146—177)

My invention relates to vegetable graters, and has among its objects and advantages the provision of an improved grater particularly suitable for grating potatoes, wherein novel means are incorporated for effectively supporting the potatoes and grating the same by an easily manipulated rotary movement, and in which the grater structure includes a housing having its bottom part arranged to constitute a receptacle.

Figure 1:
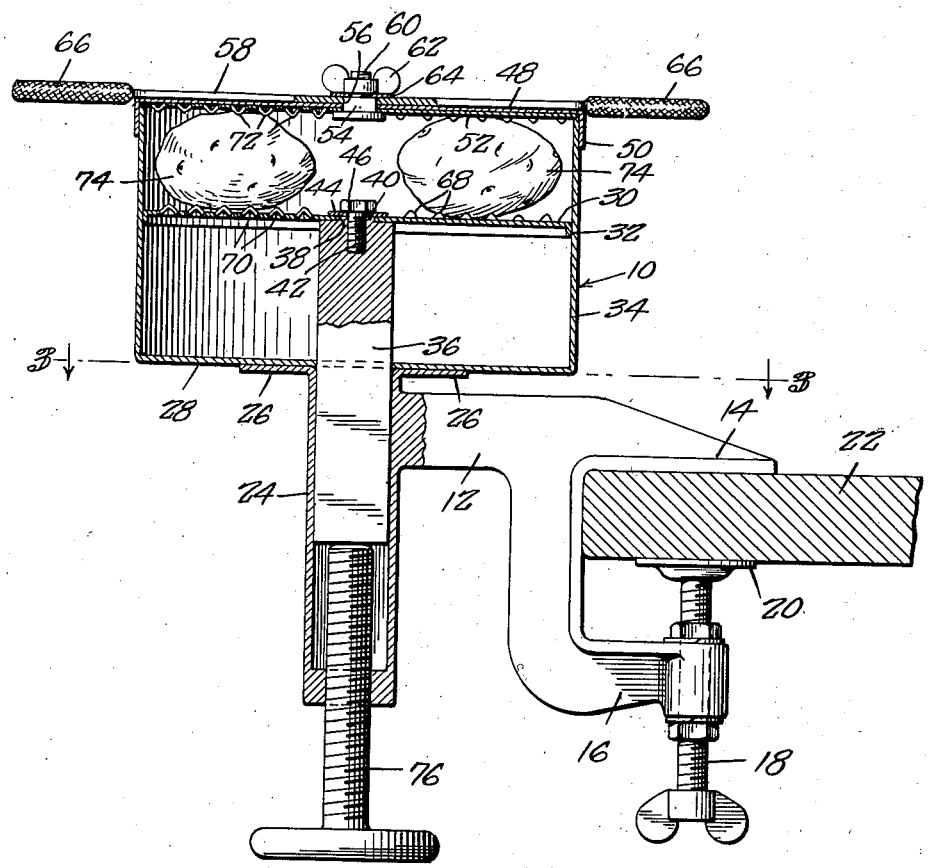
Figure 1 is a vertical sectional view of the invention.
Figure 2:
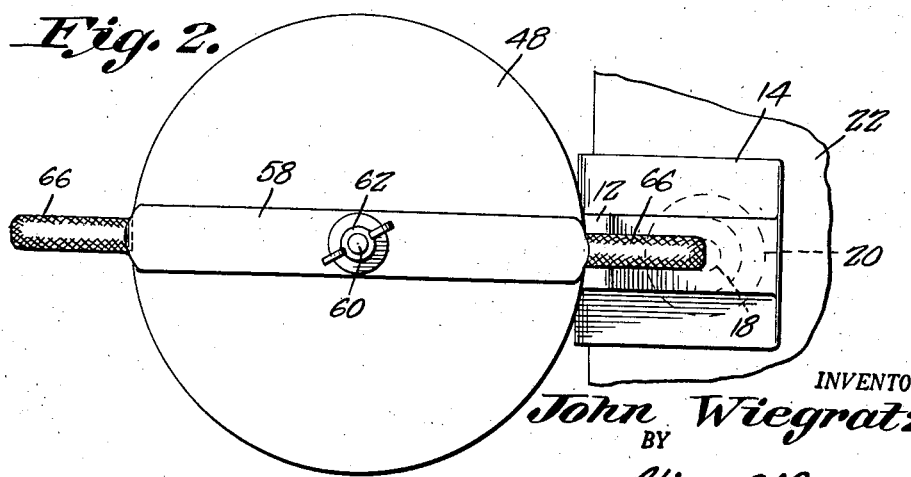
Figure 2 is a plan view.
Figure 3:
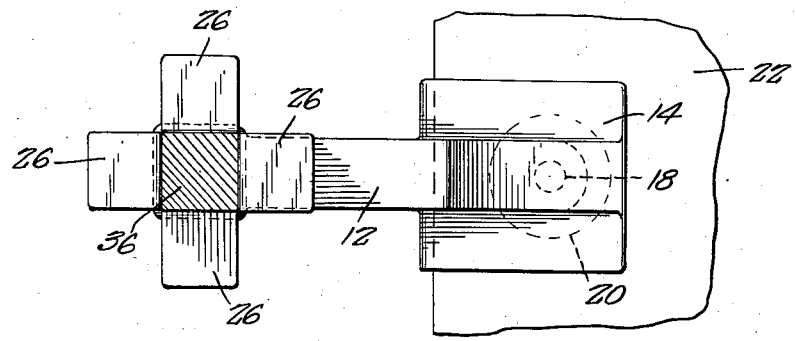
Figure 3 is a view taken from the position indicated by line 3—3 of Figure 1.
Figure 4:
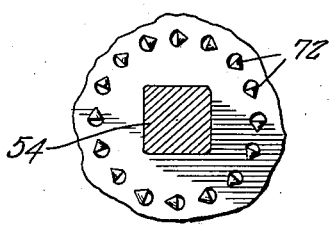
Figure 4 is an enlarged fragmentary view of one grating member.
Figure 5:
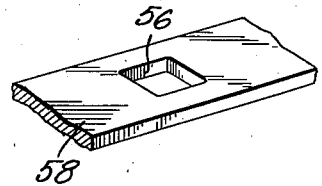
Figure 5 is a perspective view of a portion of a handle.
Figure 6:
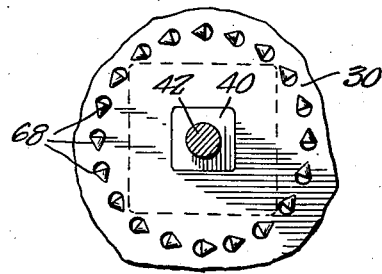
Figure 6 is an enlarged fragmentary view of a second grater.

In the embodiment of the invention selected for illustration, I make use of an annular receptacle 10 which is fixedly connected with a bracket 12 terminating in a clamp jaw 14 and a second jaw 16 having a clamp screw 18 threaded therethrough. This screw is provided with a pressure plate 20 located in line with the jaw 14 so that a shelf or table 22 may be securely clamped therebetween. The bracket 12 is provided with a vertically positioned tubular member 24, which is rectangular in cross section, and its upper end is provided with four flanges 26 which are welded to the bottom 28 of the receptacle 10.

Inside the receptacle 10 is mounted a grater plate 30 having a peripheral flange 32 fitting closely to the inner face of the receptacle wall 34. The grater plate 30 is attached to a stem 36 which is of the same contour as the tubular member 24 and has a sliding fit therein. Thus the stem 36 and the grater plate 30 may be adjusted vertically as a unit relatively to the receptacle and the tubular member.

The grater plate 30 is provided with a square opening 38 for the reception of a square pin 40 formed at the upper end of the stem 36. A screw 42 is threaded into the stem 36 for connecting the grater plate with the stem. A washer 44 is interposed between the grater plate 30 and the screw head 46.

Upon the receptacle 10 is mounted a cover 48 provided with an annular flange 50 fitting loosely on the wall 34. A second grater plate 52 is mounted inside the cover 48 flatwise against the cover and fixedly related thereto by a square pin 54. This pin extends through square openings in the cover 48 and the grater plate 52, as well as through a square opening 56 in a bar 58 lying flatwise on the cover. A threaded stem 60 is formed on the pin 54 for the reception of a wing nut 62 between which and the bar 58 is interposed a washer 64.

Handles 66 are formed at the ends of the bar 58. The grater plate 30 is punched to provide cutting teeth 68 and openings 70 through which the grated material falls into the bottom part of the receptacle. The grater plate 52 is also stamped to provide grating teeth 72, which teeth are of smaller proportions than the teeth 68.

In operation, the vegetables or potatoes 74 are placed in the receptacle 10 between the two grater plates. The material to be grated is maintained in working pressure with the two grater plates through adjustment of a screw 76 threaded through the lower end of the tubular member 24 and abutting the stem 36. The grating action is performed by rotating the cover 48 and its attached plate 52. The screw head 46 is brought into engagement with the pin 54 when the potatoes are grated down to relatively thin remains, which prevents the grater teeth on the two plates from being dulled through engagement with each other.

Without further elaboration, the foregoing will so fully explain my invention, that others may, by applying current knowledge, readily adapt the same for use under various conditions of service.

I claim:

1. A grater of the type described comprising a receptacle having a tubular member opening thereinto, a first grater means inside said receptacle and above its bottom, a stem fixed to said first grater means and slidably guided by said tubular member, a cover rotatably mounted on the receptacle, a second grater means rotatable with said cover and co-acting with said first grater means to reduce vegetables positioned therebetween, and an adjusting screw threadedly connected with the tubular member and abutting said stem to move the latter and said first grater means towards said second grater means.

2. A grater of the type described comprising a receptacle, means for mounting said receptacle on a support including a bracket provided with a clamp, a first grater means inside said receptacle and above its bottom, a cover rotatably mounted on the receptacle, a second grater means rotatable with said cover and co-acting with said first grater means to reduce vegetables positioned therebetween, a non-circular tubular member fixed to said bracket and to said receptacle, a stem fixed to said first grater means and slidably guided in said tubular member, and an adjusting screw threaded through said tubular member and engaging said stem to adjust the latter axially of the tubular member to adjust the first grater means relatively to said second grater means.

3. A grater of the type described comprising a receptacle, a first grater means inside said receptacle and above its bottom, a cover rotatably mounted on the receptacle, a second grater means rotatable with said cover and co-acting with said first grater means to reduce vegetables positioned therebetween, a handle for rotating said cover and said second grater means, said cover, the grater means and said handle being provided with non-circular openings, a key pin extended through said non-circular openings to restrain the parts for relative rotation, means clamping the cover, the second grater means and said handle into a fixed assembly, said clamping means including a stem having a non-circular pin extending through a correspondingly shaped opening in said second grater means, means threaded into said stem for clamping the latter and said second grater means into fixed relationship, and means for adjusting said first grater means relatively to said second grater means.

JOHN WIEGRATZ.